Jan. 29, 1957  E. G. GOODWIN  2,779,440
BRAKE RIGGING
Filed March 10, 1950  2 Sheets-Sheet 1

INVENTOR.
ERNEST G. GOODWIN,
BY
ATTORNEYS

Jan. 29, 1957  E. G. GOODWIN  2,779,440
BRAKE RIGGING
Filed March 10, 1950  2 Sheets-Sheet 2
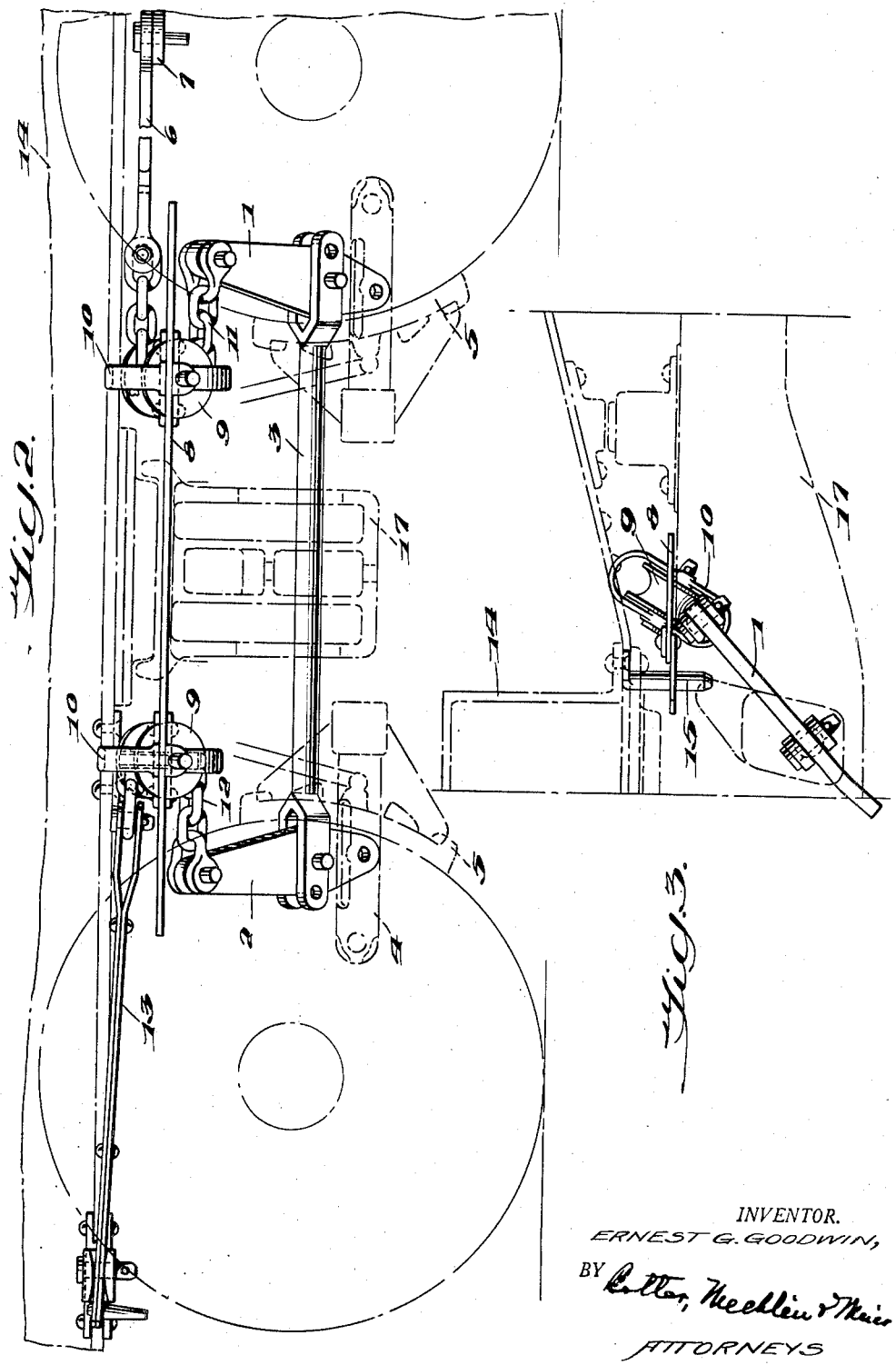
INVENTOR.
ERNEST G. GOODWIN,
BY
ATTORNEYS

United States Patent Office 2,779,440
Patented Jan. 29, 1957

2,779,440
BRAKE RIGGING

Ernest G. Goodwin, Toledo, Ohio, assignor to Unitcast Corporation, Toledo, Ohio, a corporation of Ohio Application March 10, 1950, Serial No. 148,862

9 Claims. (Cl. 188—33)

My invention relates to railway cars and more particularly to improvements to the brake rigging thereof.

As is known, the brake rigging now most commonly used on railway freight cars employs a pull rod or the like which passes over the bolster of the car truck. In a brake rigging of this construction it is impossible to anchor the dead lever thereof to the underframe of the car but instead, as has been the customary practice, the dead lever is connected to the bolster of the car truck eccentrically of the pivot point thereof. Transmission of the braking force to the truck bolster, therefore, imparts to the truck eccentric forces tending to rotate it relatively to the car underframe, thus moving the truck as a whole out of square and some of its parts out of their normal operating position. This, of course, results in abnormal wear of some of the truck parts and, by reason of the force tending to swivel the truck, pressure between a flange of the leading wheels of the truck against the rail on which the truck is moving is materially increased.

The principal object of the invention is, therefore, to provide a brake rigging for railway freight cars in which the dead lever of the rigging is connected to the underframe of the car to eliminate the eccentric forces customarily imparted to the truck and yet which enables a part of the brake rigging to extend above the bolster of the car truck through which forces are transmitted to conventional brake levers.

The primary feature of the invention consists in providing the brake rigging with a plate member which overlies the bolster of the car truck and is connected to the body bolster of the car and is adapted for transmitting braking forces to the brake levers.

Another feature of the invention consists in providing the brake rigging with a plate member which rests upon the bolster of the car truck and is provided with sheaves for chains respectively connecting a horizontally movable lever of the brake rigging with the live lever thereof and for connecting the plate member to the dead lever.

Other and more specific features of the invention, residing in advantageous forms, combinations and relations of parts, will hereinafter appear and be pointed out in the claims.

In the drawings,

Figure 2 is a side elevational view of the construction illustrated in Figure 1 showing the parts thereof in the position they occupy when the brakes are applied.

Figure 3 is an end elevational view of the same construction.

Figure 1:
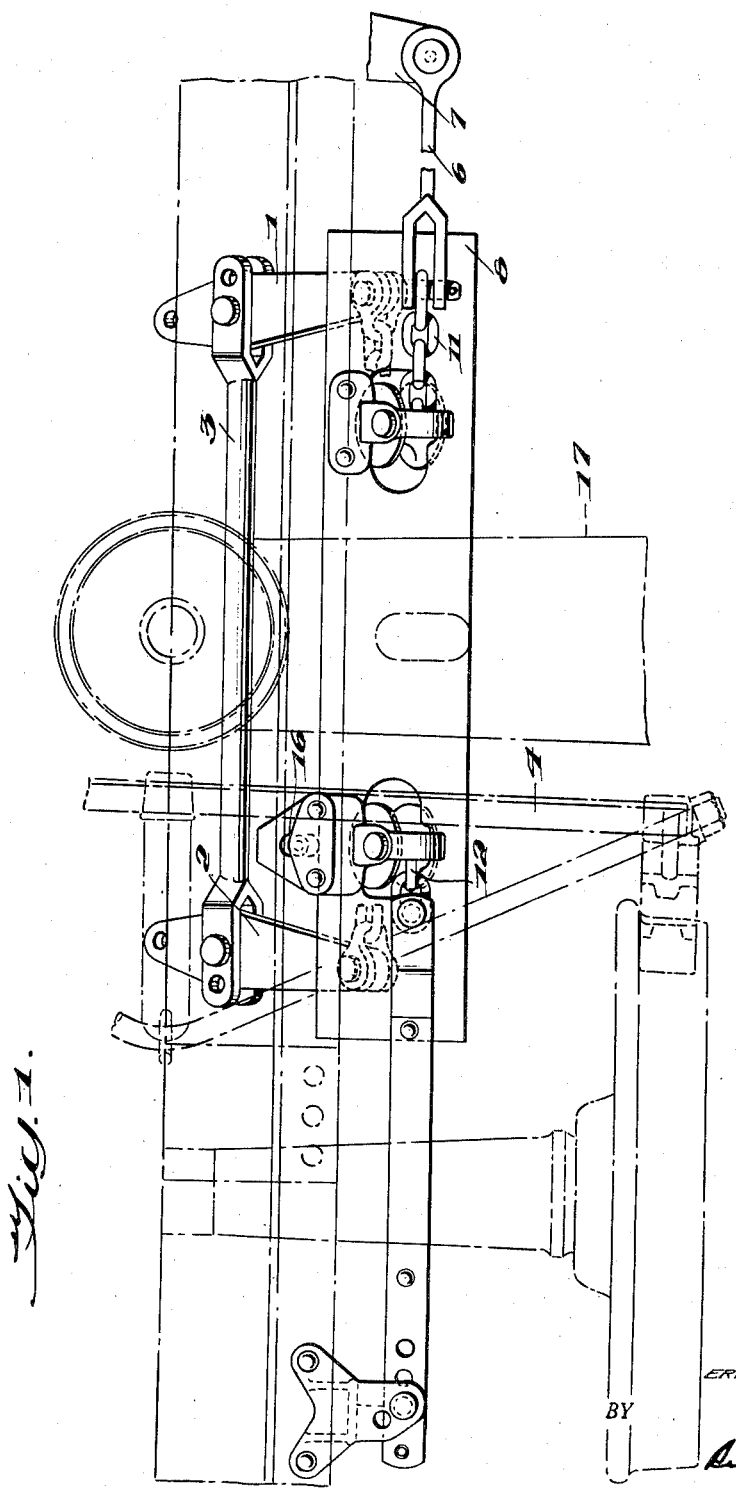
Figure 1 is a plan view of the improved brake rigging, portions of the car and brake beams being shown in dot and dash lines.

In the drawings illustrating the invention, 1 indicates the live lever and 2 the dead lever of a truck of a railway car. Intermediate their ends the two levers are connected by a compression rod 3 which extends through suitable openings in the bolster of the associated car truck. Connected to the lower end of each of the levers is a brake beam shown in dot and dash lines at 4. Each brake beam is provided with conventional brake shoes 5, also shown in dot and dash lines. The live and dead levers 1 and 2 are actuated by a pull rod or the like 6 to which force is transmitted from the conventional brake cylinder (not shown) by a horizontally movable lever 7.

Passing over, and resting upon the truck bolster when the brakes are not applied, is a flat tension plate member 8 carrying near its ends two sheaves 9 mounted in suitable housings 10. Connected to the top of the truck levers and passing around these sheaves are two chains 11 and 12, chain 11 being connected at one end to the upper end of live lever 1 while its opposite end is connected to pull rod 6 and chain 12 being connected at one end to the upper end of dead lever 2. The other or opposite end of chain 12 is connected to a rod 13 which is securely anchored to a bracket fixed to the adjacent outstanding flange of the center sill 14 which, like other parts of the car, is shown in dot and dash lines. Upon application of the brake forces, the chains 11 and 12 will retract the upper ends of the brake levers toward the truck bolster.

When the brake cylinder (not shown) is operated to apply the brakes, the brake forces between the two sheaves will be taken as tension in plate 8 resulting in an application of brakes to the wheels of the truck without the introduction of the eccentric forces which would occur if the upper end of the dead lever was affixed to the truck bolster in the customary manner.

There is no necessary movement of plate member 8 longitudinally of the car upon the release or the application of the brakes but a certain flexibility of movement is desired in the plate member so that it may adjust itself to transverse motion of the truck, as under normal motion of the car with the brakes released the weight of the plate and the associated sheaves is carried by the truck bolster.

In order to prevent unwanted movement of this plate but to allow for the certain limited necessary movement, the plate is secured against movement longitudinally of the car by a pin-like member 15 affixed to the center sill 14 of the car underframe. To permit the plate member to move with the car truck as it swivels, the opening 16 therein through which the pin member 15 extends, is elongated transversely of the plate, as clearly shown in Figure 1. Instead of forming the elongated opening 16 in the plate member 8 itself, the opening is preferably formed in a separate offset member which is securely riveted to the plate (see Figure 3).

The plate-like member 8 extends beyond the holes in which the sheaves are affixed, outwardly and beyond the top of the truck levers so that, when the brakes are released, the slack portions in the upper parts of chains 11 and 12 are prevented from dropping downwardly and possibly fouling the top of the brake levers or other parts of the brake rigging.

The width of the plate-like member 8 is sufficient to permit the usual transverse motion of the truck levers when the truck swivels under the car and still maintain a separation between the tops of the truck levers and those portions of the chains which overlie the plate member.

When the brakes are released, the plate member 8 will, of course, drop downwardly from the position shown in the drawings and rest upon the top of the truck bolster 17.

Various modifications may be made in the specific details and arrangement of parts herein shown without departing from the spirit and scope of the invention as defined in the appended claims.

What I claim is:

1. The combination in a brake rigging for railway cars having live and dead levers pivotally mounted on respectively opposite sides of the bolster of a car truck of the railway car, of a plate member extending longitudinally of and pivotally mounted on the car, said plate member being above and detached from the bolster of the truck, a pivoted lever acting in a substantially horizontal plane, and chains connected with the upper ends of the live and dead levers, said horizontally movable lever being connected to and acting on said live and dead levers through said plate member and chain for applying the brakes of the car truck, said live and dead levers lying in substantially the same plane and acting in opposite directions.

2. The combination in a brake rigging for railway cars having live and dead levers pivotally mounted on respectively opposite sides of the bolster of a car truck of the railway car, of a plate member extending longitudinally of the car above said bolster and having a pin and slot connection with said car, a lever pivoted to move in a substantially horizontal plane, sheaves carried by said plate member, chains connected to the upper ends of the live and dead levers and passing around said sheaves, one of said chains connecting said live and horizontally movable levers and said other chain deading said dead lever, and said live and dead levers being actuated through said chains by movement of the horizontally movable lever.

3. The combination in a brake rigging for railway cars having live and dead levers pivotally mounted on respectively opposite sides of the bolster of a car truck of the railway car, of a lever pivoted to move in a substantially horizontal plane, and a plate member extending longitudinally of the car above and normally supported by the bolster, and flexible means for respectively transmitting force from said horizontally movable lever to the live and dead levers through said plate member, the outer ends of said plate member being disposed above the upper ends of the live and dead levers for preventing interference by said flexible means with other parts of said brake rigging on release of the force on said live and dead levers.

4. The combination in a brake rigging beneath the underframe of a railway car having live and dead levers pivotally mounted on respectively opposite sides of the bolster of a car truck of the railway car, of a lever pivoted to move in a substantially horizontal plane, a plate member extending longitudinally of the car and resting on said bolster, sheaves carried by said plate, a lever movable in a substantially horizontal plane, and chains passing around said sheaves respectively connected to said live and dead levers, the chains connected to said live and dead levers being actuated by said horizontally movable lever and the chain connected to the dead lever being anchored to the underframe of the car.

5. The combination in a brake rigging beneath the underframe of a railway car having live and dead levers pivotally mounted on respectively opposite sides of the bolster of a car truck of the railway car, a lever movable in a substantially horizontal plane, a plate member extending longitudinally of the car, means for connecting said plate member to said horizontally movable lever and said live and dead levers, said means serving to transmit force to said live and dead levers upon actuation of said horizontally movable lever, and means secured to the underframe of the car for limiting movement of said plate member relative to said truck bolster.

6. The combination in the brake rigging of a railway car having a truck provided with a bolster pivotally connected to the underframe of the car, of a plate adapted to rest on the bolster of the car truck for transmitting braking forces, and means secured to the underframe of the car for limiting movement of said plate relatively to the bolster, said means including a vertically disposed depending pin.

7. The combination in the brake rigging of a railway car having a truck provided with a bolster pivotally connected to the underframe of the car, of a plate member for transmitting braking forces extending longitudinally of the car, said plate being formed with an elongated slot extending transversely thereof, and means depending from the underframe of the car for limiting movement of the plate relatively to the truck bolster.

8. The combination in a brake rigging for railway cars having live and dead levers pivotally mounted on respectively opposite sides of the bolster of a car truck of the railway car, of means for supplying force to said levers for applying the brakes of said truck to the car wheels, said means including a plate member extending longitudinally of and pivotally secured to the car, said plate member being above and detached from said bolster and means connecting said plate member to said live and dead levers.

9. The combination in the brake rigging of a railway car having a truck provided with a bolster pivotally connected to the underframe of the car and truck levers pivotally mounted on opposite sides of said bolster, of a plate member connected and transmitting braking forces to said truck levers, said member being detached from and normally resting upon said bolster and extending longitudinally of the car, and means engaging said car body for maintaining said plate member in position.

References Cited in the file of this patent
UNITED STATES PATENTS

| | | |
|---|---|---|
| 135,212 | Elder | Jan. 28, 1878 |
| 429,332 | Bayley | June 3, 1890 |
| 465,266 | Hinckley | Dec. 15, 1891 |
| 656,516 | Clark | Aug. 21, 1900 |
| 1,120,090 | Sauvage | Dec. 8, 1914 |
| 1,227,961 | Sauvage | May 29, 1917 |
| 2,215,239 | Baselt | Sept. 17, 1940 |